Figure 1:
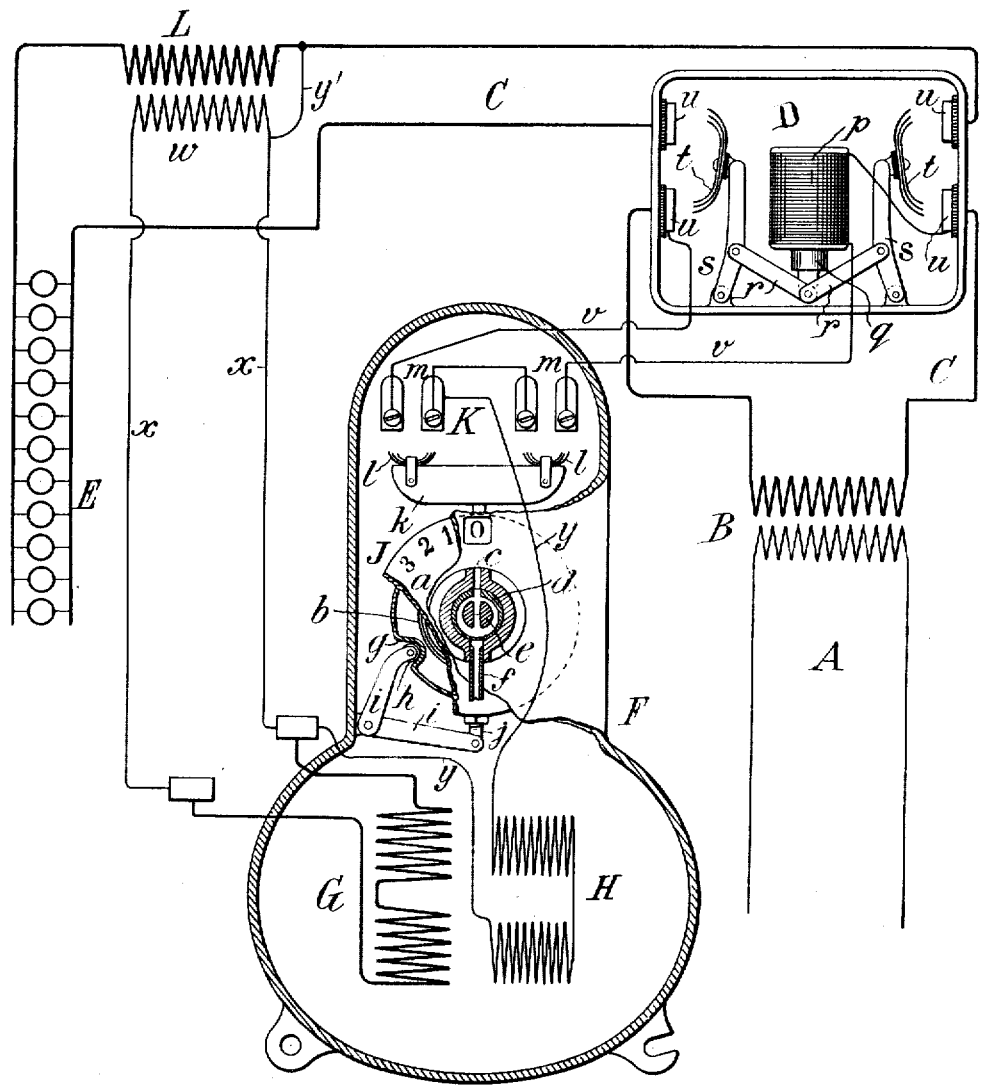

No. 844,436. PATENTED FEB. 19, 1907.
J. J. WOOD.
METERING AND CONTROLLING SYSTEM FOR ELECTRIC CIRCUITS.
APPLICATION FILED SEPT. 12, 1905.

2 SHEETS—SHEET 1.

WITNESSES:

INVENTOR:
James J. Wood,
By Attorneys,

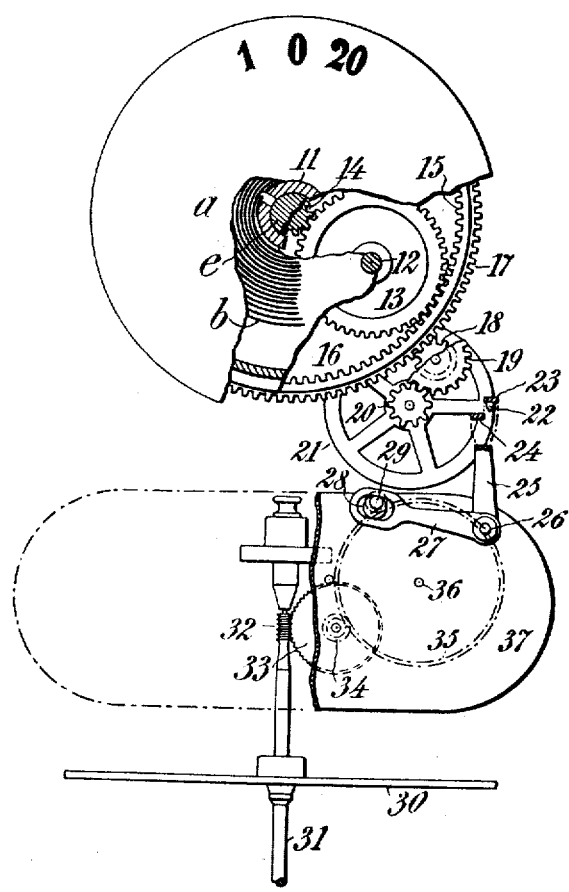

UNITED STATES PATENT OFFICE.

JAMES J. WOOD, OF FORT WAYNE, INDIANA.

METERING AND CONTROLLING SYSTEM FOR ELECTRIC CIRCUITS.

No. 844,436. Specification of Letters Patent. Patented Feb. 19, 1907.

Application filed September 12, 1905. Serial No. 278,084.

*To all whom it may concern:*

Be it known that I, JAMES J. WOOD, a citizen of the United States, residing at Fort Wayne, in the county of Allen and State of Indiana, have invented certain new and useful Improvements in Metering and Controlling Systems for Electric Circuits, of which the following is a specification.

This invention relates to means for controlling electric circuits in connection with meters for measuring the current used.

Prepayment-meters are now well known in which the insertion of one or more coins and the operation by means thereof of a suitable coin-operated mechanism closes an electric switch and sets the meter in operation, so that it will maintain the circuit closed until the amount of electric energy paid for by the inserted coins shall have been consumed, whereupon the meter will cause the operation of the switch to break the circuit, thereby shutting off the supply of further electric energy until the customer prepays therefor by the insertion of an additional coin or coins. Such a prepayment-meter includes a switch, a coin-operated mechanism for opening it and counting up to the consumer's credit the inserted coin or coins, and an electric meter for measuring the energy consumed and for causing the final opening of the switch. Such a meter is necessarily limited in capacity by the conductivity of its series coil and the capacity of its switch. The great variety of requirements of different customers may be provided for by constructing meters of varying capacities; but this would involve an undesirably large number of standard sizes of meters. It is desirable to as far as possible make one kind or size of meter applicable to a great variety of requirements, and to accomplish this object is the purpose of the present invention. I accordingly select as a standard size a meter of sufficient capacity to answer the requirements of the majority of consumers, and to provide for those cases in which a larger capacity is needed I make provision for utilizing such standard meter both for metering a circuit carrying currents in excess of the capacity of the meter and for operating a switch exterior to the meter and which is of adequate capacity to control such circuit. To these ends instead of introducing the meter directly in circuit with the lamps, motors, or other translating or energy-consuming devices, so that the whole current thereto flows through the series coil of the meter, I arrange the meter to receive only a determined proportion or percentage of the energy consumed in the customer's circuit, and instead of arranging the cut-off switch of the meter to directly open or close the customer's circuit I utilize this switch for the purpose of controlling an electrically-operated relay or remote-control switch, which in turn opens or closes the customer's circuit. This relay-switch may be made of varying sizes and of any required capacity.

My invention is most readily applicable with an alternating-current system of distribution, and accordingly I will illustrate and describe it with special reference thereto.

Figure 1 of the accompanying drawings is a circuit diagram including an elementary illustration of certain portions of a prepayment-meter and an elementary illustration of a suitable magnetic or relay switch. Fig. 2 is a front elevation of certain other portions of the meter.

Referring to Fig. 1, let A designate a line-circuit or portion thereof leading from the power-station and carrying any suitable alternating currents. B is the usual transformer, through which the electric energy is communicated from the line-circuit A to the customer's circuit C and by which the potential or electromotive force is usually diminished. D is the controlled magnetic switch for breaking or closing the customer's circuit. To avoid confusion, I will refer to this as the "relay-switch." E is the portion of the customer's circuit which includes the translating or energy-consuming devices. F is as a whole a prepayment electric meter of any suitable type. This meter includes any suitable coils arranged according to any known or suitable system for controlling any usual armature or rotor, the particulars of which do not concern my invention. Merely as an illustration I show a series coil or coils G and a shunt coil or coils H. For complete information as to a suitable construction of electric meter reference is made to my Patent No. 780,769, dated January 24, 1905. The prepayment-meter F includes also a coin-operated prepayment mechanism J and a switch K, which latter, to avoid confusion, I will refer to as the "cut-off." The cut-off switch K may be operated in any suitable manner from the coin-actuated prepayment mechanism J. The latter is operated by the insertion of coins and by the electric meter to such effect, preferably, that upon the insertion of one or more coins it counts up the value thereof to the credit of the customer, and as the meter indicates the consumption of electric energy the prepayment device counts down or diminishes this credit, and upon the final consumption of the energy purchased by the inserted coins it causes or permits the closing of the switch. The details of the mechanism or its operation are immaterial, it being only essential that the insertion of a coin shall cause the cut-off to be closed, and the consumption of the energy thus prepaid for shall cause the cut-off to be opened. A suitable construction of prepayment-meter adapted to perform these functions is fully set forth in my application filed December 3, 1904, Serial No. 235,412, patented December 5, 1905, No. 806,722, to which reference is made. For the purposes of the present invention it will be sufficient to say that in the elementary or diagrammatic illustration contained in Fig. 1 a disk or credit-indicator $a$ is turned against the stress of an internal spring $b$ by the act of inserting a coin at a slot $c$ and turning a barrel $d$, so that the coin acts to turn an inner spindle $e$, from which motion is communicated to the disk $a$, after which the coin falls out through a conduit $f$ into any desired receptacle. The first turning of the disk $a$ acts, through a cam upon a roller $h$, to turn a lever $i$ and through a rod $j$ to press up a cross-piece $k$, carrying conducting springs, brushes, or bridges $l\ l$, and pressing them against terminal contacts $m\ m$ to close the circuit. The cut-off K comprises these brushes and contacts. Obviously a single brush $l$ and pair of contacts $m$ will suffice, or any other known construction of electric switch or cut-off might be used, the entire illustration of the prepayment mechanism and cut-off being here given by way only of affording one example of the application of my invention.

While my present invention is not limited to any special construction of the mechanism of the prepayment-meter, yet to facilitate an understanding of the operation I have shown in Fig. 2 those features of my aforesaid application (Patent No. 806,722) which constitute the "counting-down mechanism" of one of the embodiments of the invention set forth therein. The disk or indicator $a$ is constructed as a barrel or case turning on a fixed bushing 11 and inclosing the spring $b$, which is fastened at one end to this bushing and at the other end to the barrel. The back of the barrel carries a stud 12, on which turns a planet-wheel 13, which meshes with a pinion 14, formed on the rear portion of the aforesaid spindle $e$, and on its opposite side meshes with gear-teeth 15, forming part of a gear-wheel 16, which has outer teeth 17, meshing through a train 18 19 20 with an escape-wheel 21, having an escape-tooth 22, which is controlled by pallets 23 24 on an escapement-arm 25, pivoted at 26, and to which is fastened an arm 27, in the slot of which turns an eccentric 28, fixed on a spindle 29, which is rotated by the totalizing mechanism of the meter. The meter is shown as having as its rotary member a disk-armature 30, mounted on a spindle 31, formed with a worm 32, which turns a worm-wheel 33, which through a pinion 34 drives the gear 35 of the units-spindle 36, forming part of the totalizer, of which only the front plate 37 is shown. The spindle 29 is driven from any suitable part of the totalizer-train.

The insertion of successive coins results in imparting successive half-turns to the spindle $e$, which (the gear 16 being stationary) causes the planet-gear 13 to travel intermittently around, thereby carrying with it the indicator $a$ and counting up how many coins have been inserted. After the first movement from the starting or zero position, which closes the cut-off, the latter remains closed until the indicator returns to its zero position. Its return is by successive step-by-step movements under control of the meter through the counting-down mechanism, of which an example is shown in Fig. 2. Thus such number of rotations of the armature as corresponds to a prescribed expenditure of electric energy imparts one complete rotation to the eccentric 28, thereby rocking the escape-arm 25 slowly from side to side, so that its pallets 23 24 successively release the tooth 22, permitting the escape-wheel 21, impelled by the stress of the spring $b$, communicated through the train of gearing, to execute one revolution, so that the wheel 16 turns such fraction of a revolution as will displace the planet-wheel 13, and with it the indicator $a$, backward a distance equal to its forward movement upon the insertion of a coin. The last of these successive backward or counting-down movements thus restores the indicator to the initial or zero position shown, so that the cut-off K is opened by the dropping of the roller $h$ into the recess $g$, Fig. 1, thereby lowering the arm $i$, rod $j$, and cross-piece $k$.

The relay-switch D comprises, essentially, an electromagnet or solenoid and any suitable electric switch or cut-out operated thereby, the coil of the magnet being in circuit with the cut-off K, so that the latter becomes the circuit-breaker controlling the relay-switch. The relay-switch is shown as having a fixed coil $p$ and a movable core $q$, the latter acting through toggle-links $r\ r$ to move levers $s\ s$, carrying conducting-brushes $t\ t$ into or out of contact with fixed contact-terminals $u\ u$. While it is preferable to use a double-pole switch, a single-pole switch might be used, and the movable member thereof may be in any suitable way connected to the movable member of the magnet or solenoid. The relay-switch D has its terminals $u$ connected in the customer's circuit C, and these terminals and the conducting-brushes $t$, which serve as bridges, must of course be given adequate conductivity for carrying the maximum current which may traverse this circuit. The coil $p$ is connected in a shunt-circuit $v\ v$, which, in effect, bridges the terminals of the secondary of the transformer B, and which shunt is opened or closed by the cut-off K.

Instead of connecting the coils of the meter directly in the customer's circuit, as is usual, an indirect connection is made by which some definite proportion or percentage of the energy transmitted to the circuit E is communicated to the coils of the meter. The most convenient means for accomplishing this result is to provide what I may call a "current" or "percentage" transformer L, the primary of which is located in the customer's circuit and the secondary $w$ of which is connected in a circuit $x\ x$, leading to the meter and connected in any usual way with the series meter-coils G. The transformer L is so wound that its secondary $w$ receives a definite and predetermined proportion of the energy traversing the primary coil—say, for example, five per cent. The proportions may vary in every separate installation, being limited by the relation between the maximum capacity of the meter and the maximum capacity of the customer's circuit—that is to say, the maximum current in the customer's circuit should induce in the secondary a current not exceeding the maximum for which the meter is designed. The definite relation between the primary and the secondary of the percentage-transformer being known, the meter will record in the same relation—that is to say, for example, if the ratio be five per cent. it will record five per cent. of the consumed energy, and hence it is only necessary to provide it with a scale graduated to indicate one hundred per cent. of energy for every five per cent. actually passing through the meter.

The operation is as follows: Starting with the open position of the respective switches, let it be supposed that the customer deposits one or more coins in the prepayment-meter and properly actuates the same. The immediate result thereof is the closing of the cut-off K, which by closing the shunt $v$ energizes the coil $p$, and the attraction of its core moves the brushes $t$ into contact with the terminals $u$, and thereby closes the customer's circuit C, so that the current is conducted to the consuming portion E thereof. The action of the percentage-transformer L causes a proportionate but lesser manifestation of energy in the local circuit $x$ and by energizing the coils G operates the meter at a proportionate rate of speed. The meter in turn controls the prepayment mechanism, and when the amount of energy prepaid for by the value of the coins inserted has been consumed the prepayment mechanism operates the cut-off K, thereby breaking the shunt $v$, deënergizing the magnet $p\ q$, and causing the relay-switch D to open, (by gravity or otherwise,) thereby breaking the customer's circuit C and cutting off the supply of energy. Upon the insertion of another coin or coins the operation is repeated.

One important application of my invention is to the operation of electric signs or the illumination of show-windows or the like, where it is desired that the operation shall continue for only a predetermined time, whereupon the current shall be cut off and further expenditure shall be saved without the necessity of having some person operate a switch at the desired time. With any given installation it is known or can be determined by experiment how long the operation will continue for each coin inserted, so that the consumer by inserting into the meter the number of coins required to keep the system in operation as many hours as he desires may maintain his show-window, sign, or the like in operation up to approximately any desired hour in the night, whereupon the meter will operate the relay-switch and shut off the current automatically. My invention is applicable generally wherever it is desired to control by a prepayment-meter a customer's circuit carrying a current in excess of that for which the meter is designed. My invention thus enables one standard size or capacity of prepayment-meter to be used in connection with any customer's circuit, whatever its capacity, within reasonable limits, it being only necessary that the relay-switch be given adequate capacity and that the percentage-transformer be wound to afford the requisite ratio between the meter-current and that of the customer's circuit.

The shunt-coils H of the meter may be variously arranged to receive the electromotive force of the secondary of transformer B. I have shown them in a shunt-circuit $y$, which is in parallel with the coil $p$. One terminal may lead to one of the contacts $m$ and the other to the shunt $x$, which latter is connected to the circuit C by a bridge $y'$, or the wires $y$ might be led directly to the circuit C.

It is important that the relay-switch, like the meter, be inclosed in a casing which is sealed to prevent tampering therewith.

It is preferable to construct the relay-switch to close the customer's circuit when its magnet is energized and open it when it is deënergized; but my invention is not limited to this arrangement. With such a relay-switch it follows that the cut-off K be arranged, as shown, to break the shunt $v$ when the customer's prepaid credit is exhausted and close it when a new coin is inserted; but my invention is not limited to this specific mode of action of the cut-off.

My invention is susceptible of various modifications in matters of construction, electrical proportions, and arrangement, as will be readily understood by those skilled in the art.

In another application, Serial No. 280,591, filed September 29, 1905, I have set forth in detail a construction of magnetic switch which is well adapted to serve as the relay-switch D of my present invention. I make no claim in this application to any special construction of such switch.

When applied to direct-current circuits, the current-transformer is omitted and the series coils G of the meter may be applied directly in the customer's circuit in the ordinary manner, or any known means may be provided for dividing the current proportionally, so as to direct a known percentage through the meter-coils, such as by dividing the load and connecting the meter with one division thereof or by introducing a motor-generator or rotary transformer in place of the transformer L.

What I claim is—

1. The combination of an electric meter, a customer's circuit, a separate relay-switch for opening and closing the customer's circuit, means controlled by the meter for opening said switch upon the recording of a predetermined amount of electric energy, and means for applying to the meter a portion only of the energy expended in the customer's circuit to operate the meter.

2. The combination of an electric meter, a relay-switch, a customer's circuit controlled by said relay-switch, means for opening said switch under control of the meter, and means for diverting from said circuit a determined percentage of the energy consumed therein and applying the same to control said meter, whereby the latter records at a rate proportional to the consumption, until it causes the opening of said relay-switch, which breaks the customer's circuit.

3. The combination in an alternating-current system of an electric meter, a relay-switch, a customer's circuit controlled by said relay-switch, means controlled by said meter for opening said switch, and a percentage-transformer having its primary in said customer's circuit and its secondary in circuit with the meter.

4. The combination of an electric meter comprising series and shunt coils, a cut-off switch, and means for operating said switch under control of the meter, a customer's circuit controlling the meter through its series coil, a relay-switch controlling said circuit, said switch comprising a magnet a connection between the cut-off of the meter and the magnet of said relay-switch, and a shunt-circuit including the shunt-coil of the meter.

5. The combination in an alternating-current system of an electric meter comprising series and shunt coils, a counting-down mechanism controlled by the meter, and a cut-off operated by said counting-down mechanism, a customer's circuit, a percentage-transformer therein with its secondary in circuit with said series coil, a relay-switch controlling the customer's circuit, said switch comprising a magnet a shunt including the magnet of said switch and the cut-off of the meter, and another shunt including the shunt-coil of the meter and arranged to be controlled by said cut-off.

6. The combination of an electric meter having a counting-up mechanism and a counting-down mechanism, the latter controlled by the meter, a relay-switch, means for closing said switch by the operation of the counting-up mechanism, and for opening it by the operation of the counting-down mechanism, a customer's circuit controlled by said relay-switch, and means for diverting from said circuit a determined percentage of the energy consumed therein and applying the same to control said meter, whereby the latter records at a rate proportional to the consumption, until it causes the opening of said relay-switch, which breaks the customer's circuit.

In witness whereof I have hereunto signed my name in the presence of two subscribing witnesses.

JAMES J. WOOD.

Witnesses:
DOMINGO A. USINA,
THEODORE T. SNELL.